US006990510B2

(12) United States Patent
Friend et al.

(10) Patent No.: US 6,990,510 B2
(45) Date of Patent: Jan. 24, 2006

(54) WIDE ADDER WITH CRITICAL PATH OF THREE GATES

(75) Inventors: David Michael Friend, Rochester, MN (US); David Arnold Luick, Rochester, MN (US); Nghia Van Phan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 10/054,065

(22) Filed: Jan. 22, 2002

(65) Prior Publication Data

US 2003/0140080 A1    Jul. 24, 2003

(51) Int. Cl.
*G06F 7/50*    (2006.01)

(52) U.S. Cl. ..................................... 708/712

(58) Field of Classification Search ......... 708/710–713
See application file for complete search history.

(56) References Cited

U.S. PATENT DOCUMENTS 5,327,369 A * 7/1994 Ashkenazi .................. 708/710
6,373,290 B1 * 4/2002 Forbes ........................ 326/98

FOREIGN PATENT DOCUMENTS

| JP | 05-061643 | 3/1993 |
| JP | 06-282417 | 10/1994 |
| JP | 11-353156 | 12/1999 |

OTHER PUBLICATIONS

Yee et al "Clock-Delayed Domino for Adder and Combinational Logic Design", 1996 IEEE, pp. 332-337.*

* cited by examiner

*Primary Examiner*—Tan V. Mai
(74) *Attorney, Agent, or Firm*—Moser Patterson & Sheridan LLP

(57)    ABSTRACT

Apparatus and method for performing fast arithmetic operations, including addition, in a pipelined circuit. In one embodiment, the apparatus comprises a plurality of gates, the critical path through the plurality of gates being three gates delays for some embodiments. The apparatus may comprise: a first level of logic for receiving at least two binary numbers and generating multi-bit P, G, Z, and K carry signals; a second level of logic receiving the multi-bit P, G, Z, and K carry signals and generating multi-bit section-based carry signals; and a third level of logic receiving the multi-bit section-based carry signals and generating a sum of the received binary numbers, the third level of logic comprising: a plurality of domino logic gates forming sum bits using the multi-bit section-based P, G, Z, and K carry signals.

16 Claims, 14 Drawing Sheets

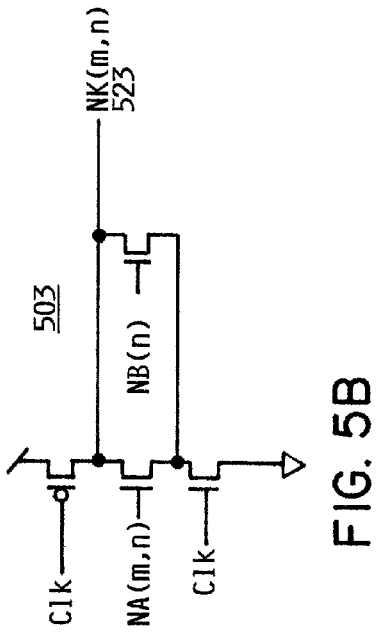
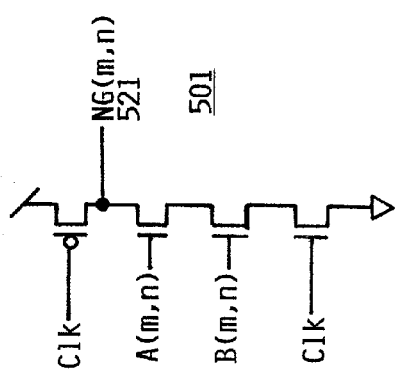
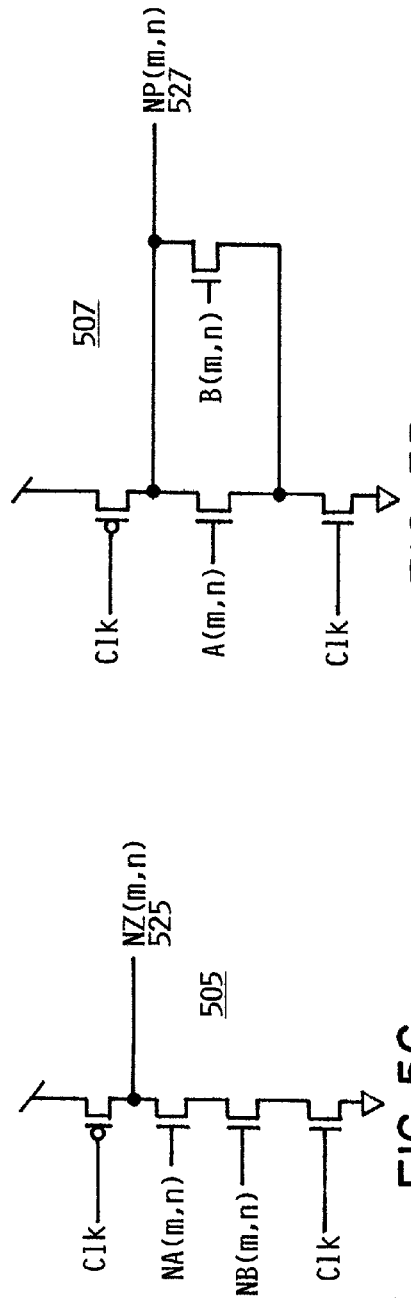
FIG. 5A
FIG. 5B
FIG. 5C
FIG. 5D

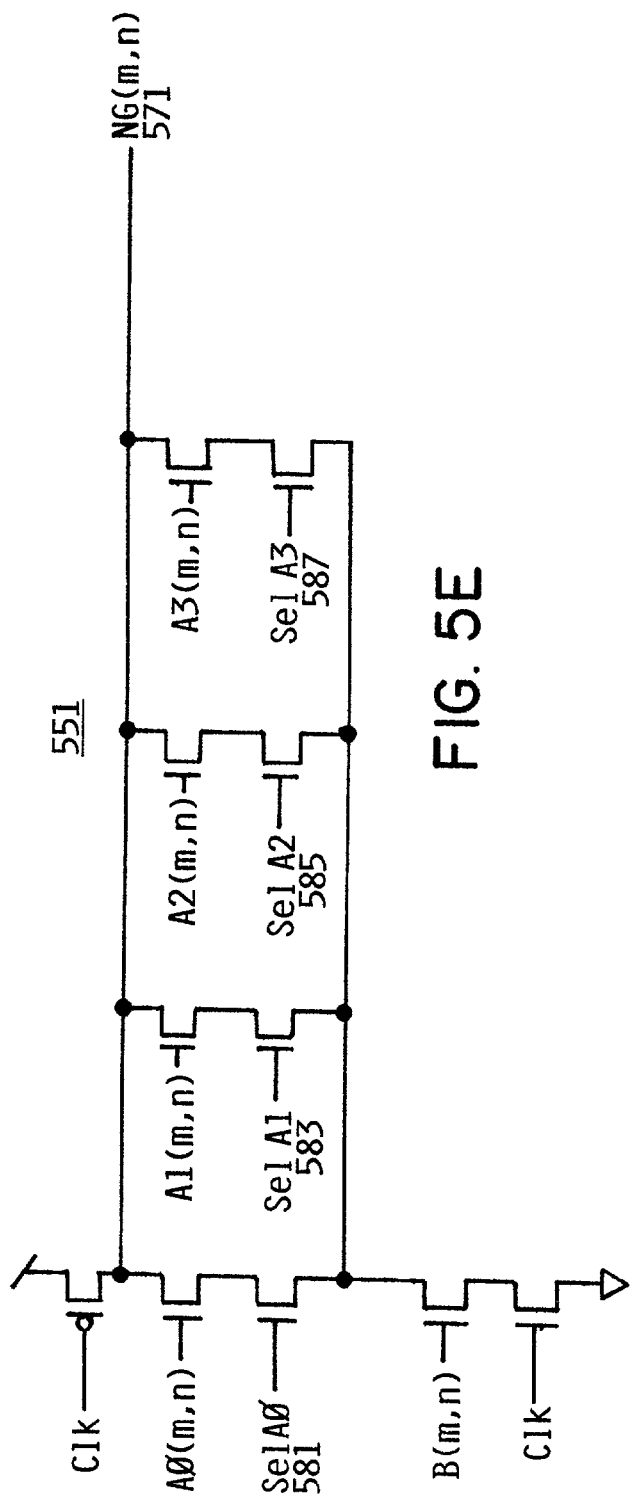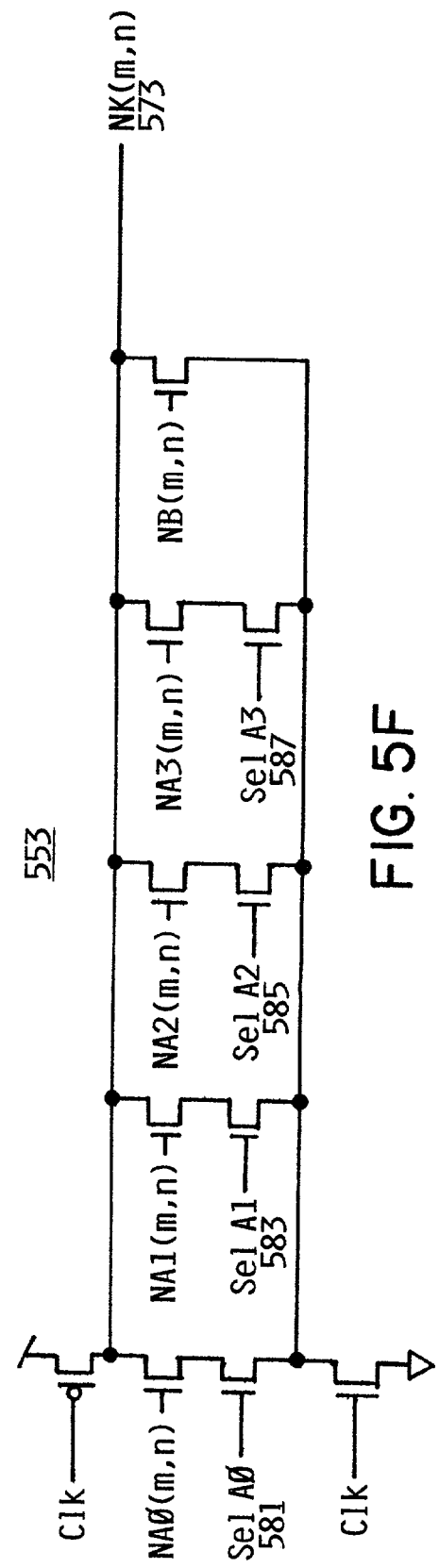

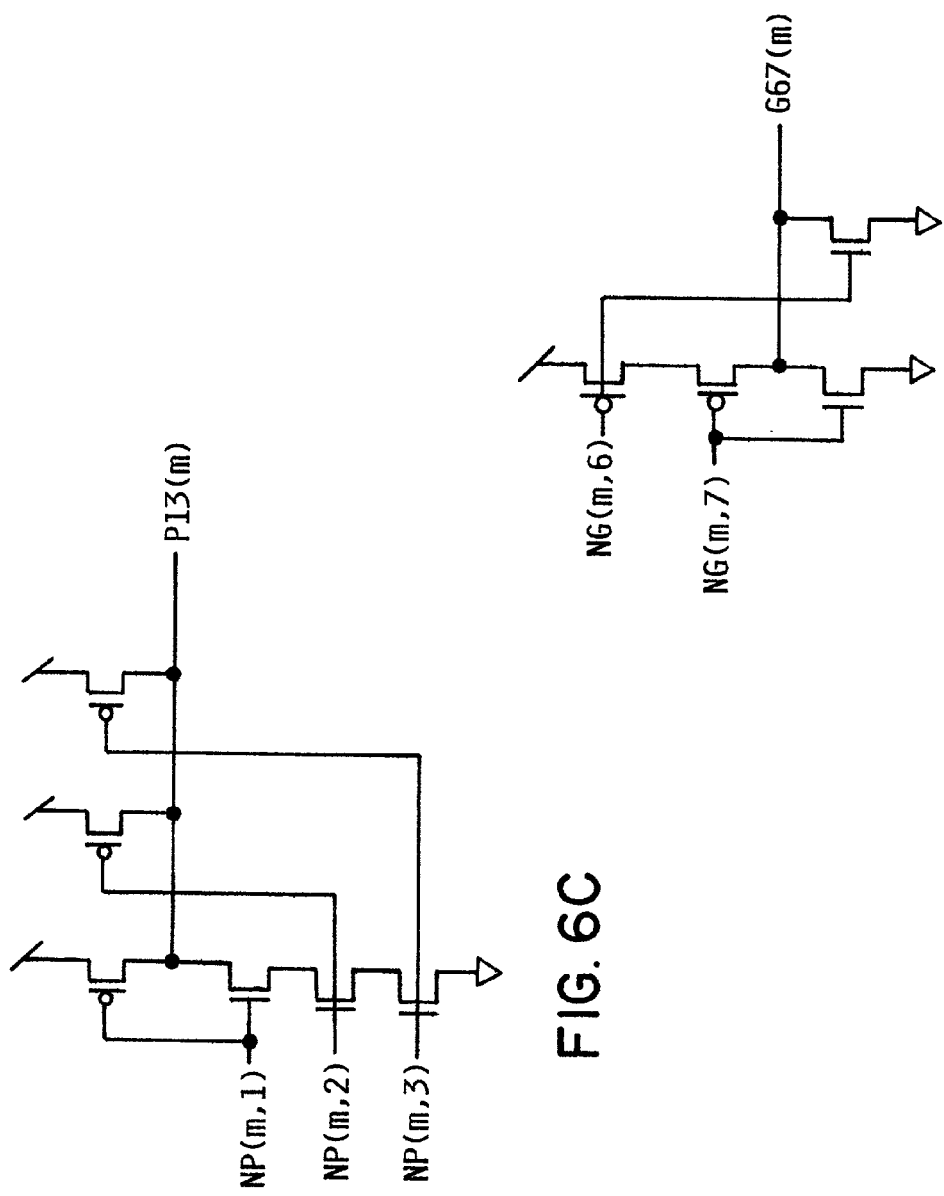

WIDE ADDER WITH CRITICAL PATH OF THREE GATES

BACKGROUND OF THE INVENTION

1. Field of the Invention

The present invention relates to the field of electronic circuits. More specifically, embodiments of the present invention relate to adders, and in particular, adders included in a pipelined processor.

2. Description of the Related Art

Users of data processing systems continue to demand greater performance for handling increasingly complex and difficult tasks. Greater performance from the processors that operate such systems may be obtained through faster clock speeds, so that individual instructions are processed more quickly. However, relatively greater performance gains have been achieved through performing multiple operations in parallel with one another.

One manner of parallelization is known as "pipelining", where instructions are fed into a pipeline for an execution unit in a processor that performs different operations necessary to process the instructions in parallel. For example, to process a typical instruction, a pipeline may include separate stages for fetching the instruction from memory, executing the instruction, and writing the results of the instruction back into memory. Thus, for a sequence of instructions fed in sequence into the pipeline, as the results of the first instruction are being written back into memory by the third stage of the pipeline, a next instruction is being executed by the second stage, and still a next instruction is being fetched by the first stage. While each individual instruction may take several clock cycles to be processed, since other instructions are also being processed at the same time, the overall throughput of the processor is much greater. With respect to pipelining, the term "stage" generally refers to the combinational logic between registers or latches.

Pipelining is the placing of logic between various types of memories. Memories include registers, latches, and Random Access Memory (RAM). A register is a type of word-based memory that stores a set of bits, and generally, all the bits are written in parallel on the edge of a clock or similar event in time. A latch is a type of word-based memory that stores a set of bits, and generally, the bits are stored while an enable signal is active, thereby allowing input changes to propagate to outputs while the enable signal is active. A latch is sometimes called a "half-register". Putting logic between half-registers has the advantage of partial cycle stealing from a prior stage, and can reduce the cycle time of a pipelined circuit. Random Access Memory (RAM) is an array-based memory that stores a plurality of words, each word being a set of bits. RAMs can have a plurality of access ports, thereby allowing multiple reads and/or writes from/to the RAM. Fast RAM, generally with multiple access ports, is sometimes called a register file.

Individual arithmetic operations, such as addition and multiplication, can also be pipelined. For example, a multiplier can be designed with four stages, and take four clock cycles to compute a result corresponding to a particular input, but accept new inputs each clock cycle. Pipelining can be applied to memories as well. For example, a memory could have the following stages: address decode; memory array access; and data output. A pipelined circuit can be composed of many stages, and include a plurality of memory, arithmetic, and logic circuits.

Greater parallelization can also be performed by attempting to execute multiple instructions in parallel using multiple pipelined execution units in a processor. Processors that include multiple execution units are often referred to as "superscalar" processors, and such processors include scheduling circuitry that attempts to efficiently dispatch instructions to different execution units so that as many instructions are processed at the same time as possible. Relatively complex decision-making circuitry is often required, however, because oftentimes one instruction cannot be processed until after another instruction is completed. For example, if a first instruction loads a register with a value from memory, and a second instruction adds a fixed number to the contents of the register, the second instruction typically cannot be executed until execution of the first instruction is complete.

The use of relatively complex scheduling circuitry can occupy a significant amount of circuitry on an integrated circuit device, and can slow the overall execution speed of a processor. For these reasons, significant development work has been devoted to Very Long Instruction Word (VLIW) processors, where the decision as to which instructions can be executed in parallel is made when a program is created, rather than during execution. A VLIW processor typically includes multiple pipelined execution units, and each VLIW instruction includes multiple primitive instructions known as parcels that are known to be executable at the same time as one another. Each primitive instruction in a VLIW may therefore be directly dispatched to one of the execution units without the extra overhead associated with scheduling. VLIW processors rely on sophisticated computer programs known as compilers to generate suitable VLIW instructions for a computer program written by a computer user. VLIW processors are typically less complex and more efficient than superscalar processors given the elimination of the overhead associated with scheduling the execution of instructions.

It is common practice for pipelined logic to be synchronously clocked. That is, a single timebase clocks the entire circuit. Alternatively, various portions of the pipelined logic can be clocked with different timebases (i.e., different frequencies), and these different timebases are usually (although not necessarily) rational number multiples of each other, thereby allowing them to be derived from a single frequency source. In the case of asynchronous circuits, there can be multiple timebases that are asynchronous to one another. It is also possible for registers to be clocked by detecting when the computation of input data is complete (i.e., self-timed circuits), resulting in fully asynchronous behavior.

One design consideration in pipelined circuits is the critical path. The critical path is the path through a circuit that takes the longest time to propagate from input to output. The critical path determines the smallest allowable clock period where, the smaller the clock period, the higher the performance. Accordingly, the performance is inversely related to the clock period. In pipelined circuits, this critical path is measured from register-to-register, latch-to-latch (or between any two of the various types of memory circuits), or input-to-output. In general terms, the critical path can be described as a number of gate delays. That is, the critical path is the maximum number of gates that input signals propagate through within a circuit. Hence, the fewer gate delays in the critical path of a circuit, the higher the circuit's performance.

One possible critical path in pipelined logic is through an adder. A typical adder performs both addition and subtraction. Generally, the critical path through an adder is primarily due to an arithmetic carry through all the bits. An arithmetic carry is the "carry out" from a bit position into the next most significant bit. For example, in an 8-bit adder, adding the bit patterns '01111111' and '01111111' causes arithmetic carries to propagate through all the bit positions. A simple type of adder allows carry values to ripple from the least significant bit to the most significant bit, but this is slow due to a long critical path. More sophisticated adders use a carry-look-ahead circuit to generate carry values. But, even for carry-look-ahead circuits, wider (i.e., more bit position) adders have a longer critical path.

Recently, microprocessor architectures have been extended from 32-bit architectures to 64-bit architectures. This change increases the width of the adders, increasing the critical path delay through the adder (e.g., by increasing the number of bits for the carry-look-ahead logic) and reducing performance. In a 64-bit processor, the critical path in the 64-bit adders could be the limiting factor in the processor's performance. Hence, it is desirable to reduce the critical path though 64-bit adders.

Typically, adders are implemented with static logic gates, and the currently popular technology is CMOS. Static gates are logic gates whose output is driven to either a "1" or "0" logic state, and do not utilize dynamic circuit properties, such as charge being stored on a non-driven node. Temporarily assuming logic gates all have about the same propagation delay, then the number of layers of logic determine the performance of the adder, and this is the maximum number of gate delays from input to output. In general, circuit designers strive to reduce the number of layers of logic in the stage of a pipelined circuit.

Another choice for the implementation of adders makes use of domino logic. Domino logic is a circuit design technique that makes use of dynamic circuits, and has the advantage of low propagation delay (i.e., they are fast circuits) and smaller area (due to fewer transistors). In domino logic, nodes are precharged during a portion of a clock cycle and conditionally discharged during another portion of the clock cycle, where the discharging phase performs the logic function. Hence, in a series of these gates, a set of nodes are all precharged, and the discharging of nodes can flow through the series of gates, analogous to a series of falling dominos. In order to provide more complicated logic functions, a large number of discharging transistors can be used in a mixture of parallel and series connections, hereinafter called a domino tree. The output from a domino tree is often buffered by an inverter, thereby isolating the dynamic node from the load. A domino tree with an output buffer constitutes one level of logic in a circuit (i.e., one gate delay).

A variation of domino logic, called complex domino logic, includes domino trees whose output is fed into static logic gates, rather than an inverter. This provides a more complex logic function because the output of multiple domino trees (i.e., the dynamic nodes) can be input to another gate. A set of domino trees with a static gate constitutes one level of logic in a circuit (i.e., one gate delay).

A variation of complex domino logic includes domino trees with both precharged high and precharged low states. For example, a first set of domino trees could be precharged high (i.e., a logic "1" state), and the outputs from this first set are input to a second set of domino trees that are precharged low (i.e., to a logic "0" state). Continuing this example, a third set of domino trees, precharged high, receive input from the output of the second set. This can be extended to any number of sets of domino trees. In this variation, an output buffer is generally not used, and therefore, two domino trees (one precharged high and one precharged low) constitute one level of logic (i.e., one gate delay).

Prior art adders use several levels of logic, or tree levels. The more levels of logic (either static or dynamic), the longer the critical path and the lower the performance. Therefore, these prior art adders are not as fast as they would be with fewer levels of logic. There are no known 64-bit adders with only three gate delays in their critical path.

Therefore, there is a need for a faster adder with fewer levels of logic.

SUMMARY OF THE INVENTION

An adder apparatus and a method for performing faster arithmetic operations in a pipelined circuit are described. The adder operates on two or more numbers and produces their sum and/or difference.

One embodiment of the adder operates on two binary numbers, each having at least 64 bits; the adder comprises a plurality of gates, and the critical path through the plurality of gates is three gate delays.

In another embodiment of the adder for adding numbers with at least 64 bits, the apparatus comprises a critical path of three gate delays. The critical path comprises: a first gate within a first level of logic, the first level of logic receiving at least two binary numbers and generating multi-bit carry signals; a second gate within a second level of logic, the second level of logic receiving the multi-bit carry signals and generating multi-bit section-based carry signals; and a third gate within a third level of logic, the third level of logic receiving the multi-bit section-based carry signals and generating a sum of the received binary numbers.

In another embodiment for adding numbers, the apparatus comprises a critical path of three gate delays. The critical path comprises: a first gate within a first level of logic, the first level of logic receiving at least two binary numbers and generating multi-bit carry signals; a second gate within a second level of logic, the second level of logic receiving the multi-bit carry signals and generating multi-bit section-based carry signals; and a third gate within a third level of logic, the third level of logic receiving the multi-bit section-based carry signals and generating a sum of the received binary numbers.

In another embodiment of the adder, the adder comprises: a first level of logic for receiving at least two binary numbers and generating multi-bit carry signals, the first level of logic comprising domino logic gates; a second level of logic receiving the multi-bit carry signals and generating multi-bit section-based carry signals, the second level of logic comprising domino logic gates; and a third level of logic receiving the multi-bit section-based carry signals and generating a sum of the received binary numbers, the third level of logic comprising domino logic gates.

In another embodiment of the adder, the adder comprises: a first level of logic for receiving at least two binary numbers and generating multi-bit P, G, Z, and K carry signals, the first level of logic comprising: a plurality of domino trees forming P, G, Z, and K carry signals; and circuits forming the multi-bit P, G, Z, and K carry signals using the P, G, Z, and K carry signals; a second level of logic receiving the multi-bit P, G, Z, and K carry signals and generating multi-bit section-based carry signals, the second level of logic comprising: a plurality of domino trees forming section-based P, G, Z, and K carry signals using the multi-bit P, G, Z, and K carry signals; and circuits forming multi-bit section-based P, G, Z, and K carry signals using the section-based P, G, Z, and K carry signals; and a third level of logic receiving the multi-bit section-based carry signals and generating a sum of the received binary numbers, the third level of logic comprising: a plurality of domino logic gates forming sum bits using the multi-bit section-based P, G, Z, and K carry signals.

Another embodiment provides a pipelined computational apparatus comprising an adder, the adder comprising a plurality of gates, and the critical path through the plurality of gates is three gate delays.

Another embodiment provides a pipelined computational apparatus comprising an adder for adding numbers with at least 56 bits, the adder comprising: a critical path of three gate delays, the critical path comprising: a first gate within a first level of logic, the first level of logic receiving at least two binary numbers and generating multi-bit carry signals; a second gate within a second level of logic, the second level of logic receiving the multi-bit carry signals and generating multi-bit section-based carry signals; and a third gate within a third level of logic, the third level of logic receiving the multi-bit section-based carry signals and generating a sum of the received binary numbers.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5A is an example domino tree forming a G carry signal.
FIG. 5B is an example domino tree forming a K carry signal.
FIG. 5C is an example domino tree forming a Z carry signal.
FIG. 5D is an example domino tree forming a P carry signal.
FIG. 5E is an example domino tree forming a G carry signal and incorporating a multiplexing function.
FIG. 5F is an example domino tree forming a K carry signal and incorporating a multiplexing function.
FIG. 6C is an example static gate forming a multi-bit P carry signal.
FIG. 6D is an example static gate forming a multi-bit G carry signal.

DETAILED DESCRIPTION OF THE PREFERRED EMBODIMENTS

In the following detailed description of an adder, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention. As an example, specific bus bit widths, data bit widths, and arithmetic unit bit widths are used to illustrate concepts, but the concepts can be applied to an apparatus with any number of bits. In the examples that include numbered bit positions, the most significant bit is numbered "0".

Figure 1:
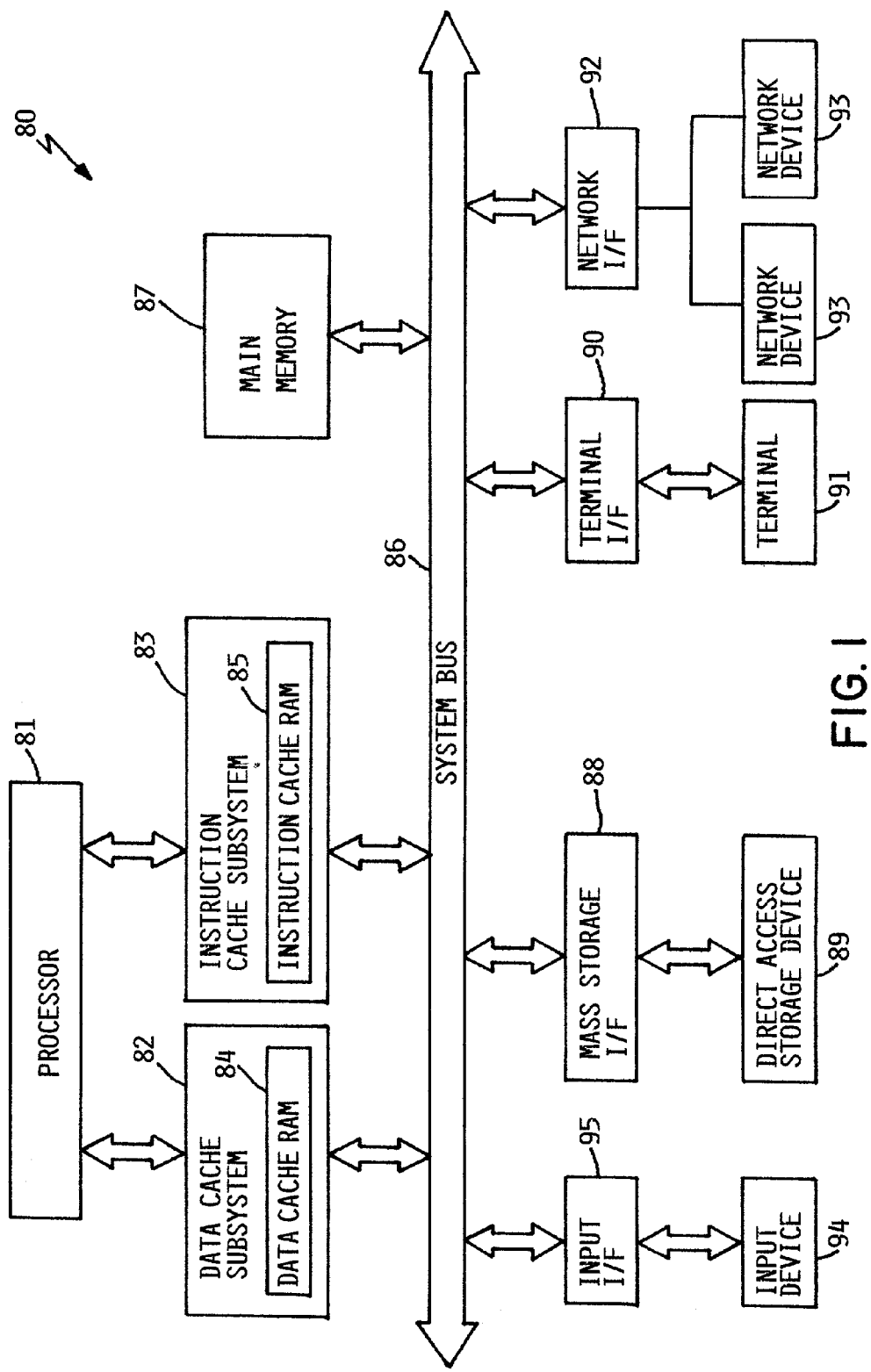
FIG. 1 shows a computer system.

FIG. 1 shows a computer system 80 according to an embodiment. Illustratively, the computer system 80 includes a system bus 86, at least one processor 81 coupled to the system bus 86 via a data cache subsystem 82 and an instruction cache subsystem 83. The data cache subsystem 82 includes a data cache RAM 84. The instruction cache subsystem 83 includes an instruction cache RAM 85. The computer system 80 also includes an input device 94 coupled to system bus 86 via an input interface 95, a storage device 89 coupled to system bus 86 via a mass storage interface 88, a terminal 91 coupled to system bus 86 via a terminal interface 90, and a plurality of networked devices 93 coupled to system bus 86 via a network interface 92.

Terminal 91 is any display device such as a cathode ray tube (CRT) or a plasma screen. Terminal 91 and networked devices 93 are desktop or PC-based computers, workstations, network terminals, or other networked computer systems. Input device 94 can be any device to give input to the computer system 80. For example, a keyboard, keypad, light pen, touch screen, button, mouse, track ball, or speech recognition unit could be used. Further, although shown separately from the input device, the terminal 91 and input device 94 could be combined. For example, a display screen with an integrated touch screen, a display with an integrated keyboard or a speech recognition unit combined with a text speech converter could be used Storage device 89 is DASD (Direct Access Storage Device), although it could be any other storage such as floppy disc drives or optical storage. Although storage 89 is shown as a single unit, it could be any combination of fixed and/or removable storage devices, such as fixed disc drives, floppy disc drives, tape drives, removable memory cards, or optical storage. Main memory 87 and storage device 89 could be part of one virtual address space spanning multiple primary and secondary storage devices.

The contents of main memory 87 can be loaded from and stored to the storage device 89 as processor 81 has a need for it. Main memory 87 is any memory device sufficiently large to hold the necessary programming and data structures of the invention. The main memory 87 could be one or a combination of memory devices, including random access memory (RAM), non-volatile or backup memory such as programmable or flash memory or read-only memory (ROM). The main memory 87 may be physically located in another part of the computer system 80. While main memory 87 is shown as a single entity, it should be understood that memory 87 may in fact comprise a plurality of modules, and that main memory 87 may exist at multiple levels, from high speed registers and caches to lower speed but larger DRAM chips.

A processor 81 includes many adders, and these adders are included in address calculations and in execution units that perform arithmetic instructions. One embodiment of an adder 100 is shown in FIG. 2.

Figure 2:
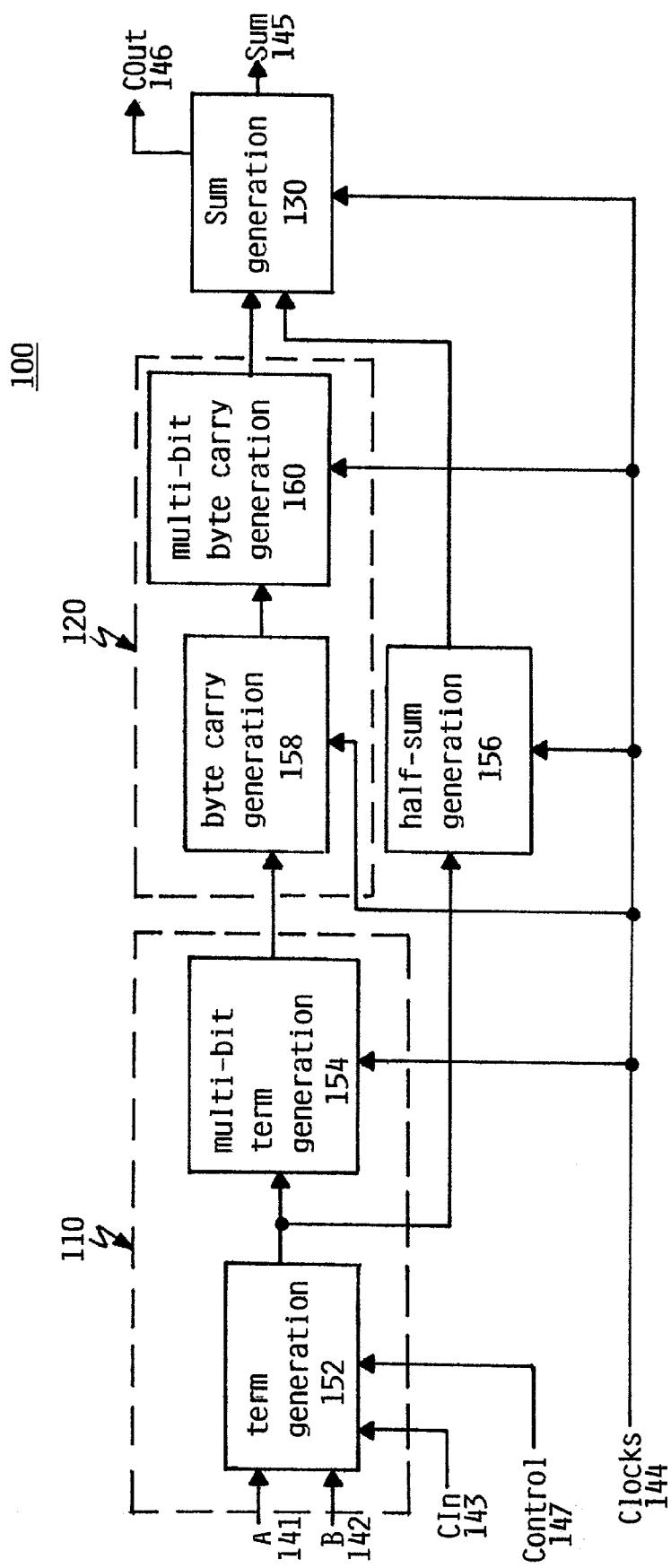
FIG. 2 is an example embodiment of the adder.

In one embodiment, shown in FIG. 2, a 64-bit adder 100 can be constructed with a critical path comprising three levels of logic: a latch 110 and two levels of combinational logic 120 and 130 (the half-sum generation 156 is not in the critical path). In one embodiment, the latch 110 and the two levels of logic 120 and 130 are implemented with domino logic gates.

Figure 3A:
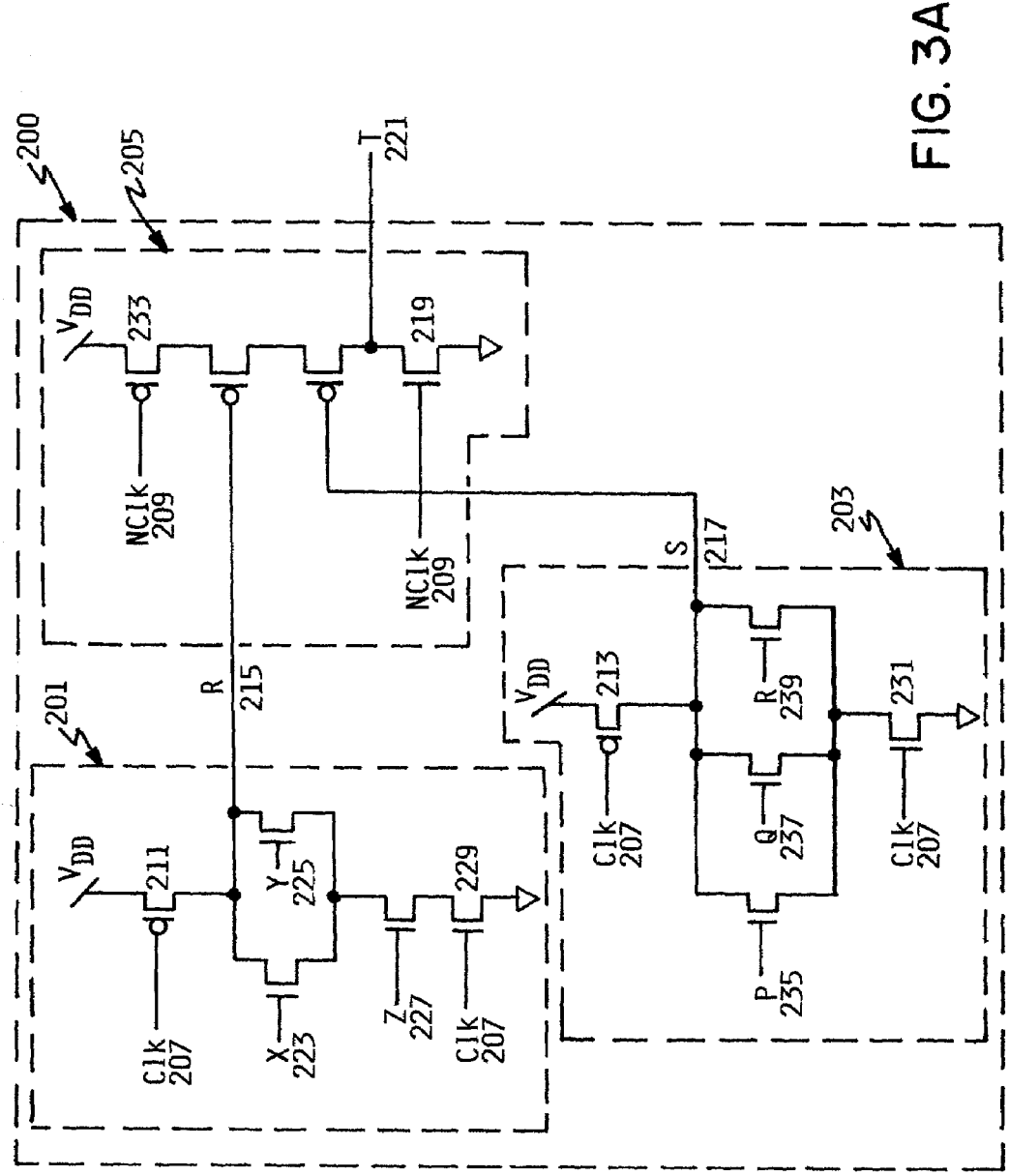
FIG. 3A is an example domino logic gate.

As an aid in the discussion of the embodiments, FIG. 3A shows an example CMOS complex domino logic gate 200, incorporating both a precharged high domino tree 201 (as the input portion of the gate 200) and a precharged low domino tree 205 (as the output portion of the gate 200). Domino tree 201 performs not(Z(X+Y)). Domino tree 203 performs not(P+Q+R). Domino tree 205 performs not(RS). The level of logic 200 is clocked by the signal Clk 207 and its compliment, NClk 209 (Hereinafter, the prefix "N" on a signal name indicates active low, or inverted, signal). While Clk 207 is low (and NClk 209 is high), PMOS transistors 211 and 213 precharge nodes R 215 and S 217 to a "1" state, respectively. Similarly, NMOS transistor 219 precharges T 221 to a "0" state. Since the values of X 223, Y 225, and Z 227 could each be "1" or "0", a transistor 229 disables the NMOS pulldown network portion of the domino tree 201. Transistor 231 performs a similar function for domino tree 203. Transistor 233 disables the pullup network portion of domino tree 205.

Hence, when Clk 207 is "0", R 215 and S 217 are precharged to "1", and T is precharged to "0". When Clk 207 transitions to a "1" (and NClk 209 to a "0"), the precharges nodes 215, 217, and 221 could float, but retain their state due to capacitance. If, for example, X 223 and Z 227 are both "1" (assume Y 225 is "0") when Clk 207 transitions to a "1", then R 215 will be pulled down. If, after R 215 becomes "0", X 223 transitions to "0", R 215 does not return to "1", seemingly in violation of the function not(Z(X+Y)). This illustrates how the inputs to a domino tree must transition monotonically (i.e., only once) in the proper direction (i.e., transition away from the precharged state) during the non-precharged portion of the clock cycle. For example, X 223, Y 225, and Z 227 can transition from "0" to "1" while Clk 207 is "1", but can not be allowed, by design of the overall circuit, to transition from "1" to "0" while Clk 207 is "1". Assuming this condition is met by all the inputs (i.e., X 223, Y 225, Z 227, P 235, Q 237, and R 239), then R 215 and S 217 must also have this required monotonic transition property, because they 215 and 217 can only transition from "1" to "0" while Clk 207 is "1". This means transistor 233 is not needed because R 215 and S 217 can't be a "0" while NClk 209 is a "1".

The example of FIG. 3A assumes CMOS technology, but the embodiments can be modified in order to apply to other circuit technologies. Also, the example (and the embodiments described below) assumes the precharged high domino trees are used first (i.e., receive the direct inputs) in a circuit. The order could be swapped (i.e., precharged low domino tree could receive the inputs) and the example circuit (and embodiments, below) could be modified to provide the same overall logic function. Also, precharged high domino trees and precharged low domino trees can be wired together in any way, and can also include static gates.

Figure 3B:
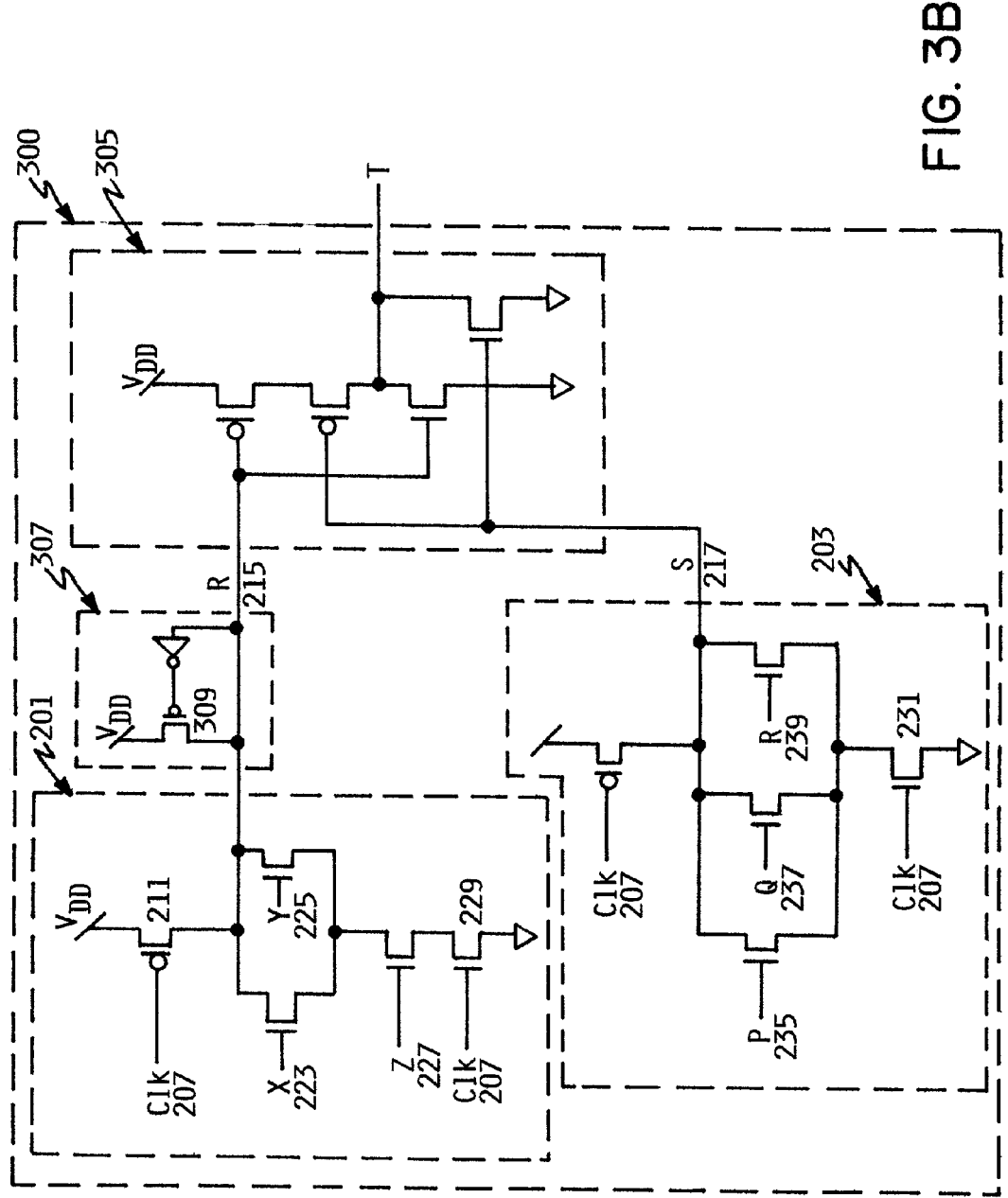
FIG. 3B is an example domino logic gate.

FIG. 3B shows a modified form 300 of the example CMOS complex domino logic gate 200, where the precharged low domino tree 205 is replaced with a static gate 305. The shown static gate 305 is not clocked, as static gates generally do not require such clocking, but clocking is possible. An example use of a clocked static gate output portion occurs when the next logic level requires a signal that is in a known state during one phase of a clock, and the input portion does not satisfy the requirement.

Also shown in FIG. 3B is an optional keeper circuit 307. The pullup transistor 309 of the keeper circuit 307 pulls up R 215 when it is already in the high state, thereby reinforcing (or "keeping") the logic "1" value. Keeper circuits are used to increase noise immunity. Keeper circuits can also hold a signal low by using a pulldown transistor rather than a pullup. A keeper circuit can have a pullup and a pulldown, thereby making the node preserve its state. The pullup transistor 309 (and/or the pulldown transistor) is generally a weak transistor.

A domino logic gate can be converted into a latch that also performs logic. For example, in FIG. 3B, the clocked transistors 211 and 229 could be conditionally clocked (using different signals on the transistor gates, known as qualified clocks). When the latch is not being loaded, the two transistors 211 and 229 are both off, causing the output node 215 to float, thereby holding the logic value. When the pullup 211 is turned on, the latch is set; and when the pulldown 207 is turned on, the latch receives input (and, also performs a logic function). A keeper circuit can be used to preserve the latch's stored logic value, and a keeper circuit with both a pullup and a pulldown will make a static latch. The latch can be used as part of a scan path for testing purposes.

In the above description, several types of domino logic gates have been described. The various sets of choices for types of domino logic gates include: (1) type of input portion: precharged high tree, precharged low tree, static gate, and buffer; (2) type of output portion of a gate: precharged high tree, precharged low tree, static gate, and buffer; (3) type of input portion clocking: clocked and non-clocked; (4) type of output portion clocking: clocked and non-clocked; (5) keeper circuits usage: on the input portion and/or the output portion; and (6) possible inclusion of a latch within the domino logic gate. Therefore, due to these sets of independent choices, many different implementations (i.e., embodiments of a logic function) are possible for a domino logic gate, even though the overall logical function is the same. An example set of choices for a domino logic gate is: precharged low non-clocked tree input portion with a keeper circuit coupled with a clocked static gate output portion. In addition, various device fabrication technologies (e.g., CMOS) can be used.

The embodiment 100 shown in FIG. 2 can be implemented with either: (1) a latch 110 and additional two levels of logic 120 and 130; or (2) three levels 110, 120, and 130 of logic. In other words, the first level of three levels of logic 110 can be either a latch that performs logic, or a level of logic without a latch.

The following description assumes a 64-bit adder is being implemented, but the concepts can be applies to any width adder. The adder 100 adds two binary numbers, A 141 and B 142, and can be optionally designed to also accept a carry input, Cin 143. The inputs, A 141 and B 142, can each be a plurality of numbers, in which case control signals 147 choose amongst the plurality of numbers. Clocks 144 are shown as being provided to every block 152, 154, 156, 158, 160, and 130, but each of these blocks can be designed as either clocked or non-clocked. The outputs are Sum 145 and a carry out signal, Cout 146.

In the following description, bit positions with a group of bits are designated with a parenthesis, such as "A2(3)" being bit number three of the value A2. The use of a variable within the parenthesis "B(n)" indicates bit number "n" within the number. The notation A(0 . . . 7) indicates the bits 0 through 7, inclusive, within the number A. Hence, for a 64-bit adder, the primary inputs are A(0 . . . 63) and B(0 . . . 63). The notation A(m,n) indicates a two-dimensional array that is m×n bits, where (m,n) is a position in that array.

In one embodiment, each functional block 152, 154, 158, 160, 156, and 130 in the adder 100 is considered as separated into sections along bit boundaries, forming a sectioned adder 400. For example, a 64-bit term generation 152 is considered to be eight 8-bit sections. The sections do not need to be any particular size and do not need to be a uniform size. The various blocks do not need to be sectioned identically. However, for illustrative purposes, each block 152, 154, 156, 158, 160, and 130 will be assumed to be 64 bits and considered to be divided into eight (represented by "M", where M=8) byte-wide sections (bit positions within sections are numbered "n", where n ranges from 0 to 7).

Figure 4A:
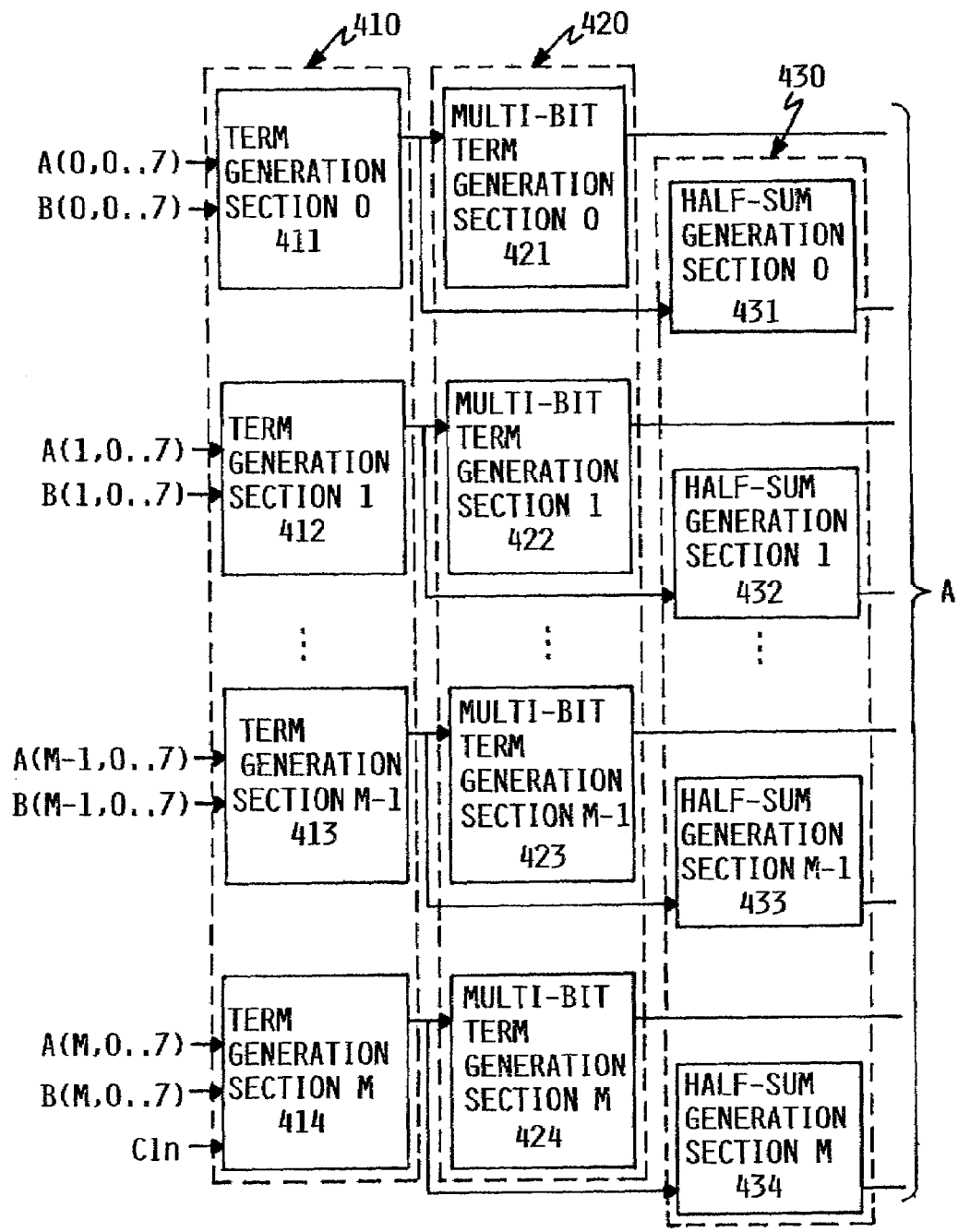
FIG. 4 is an example embodiment of the adder.
Figure 4B:
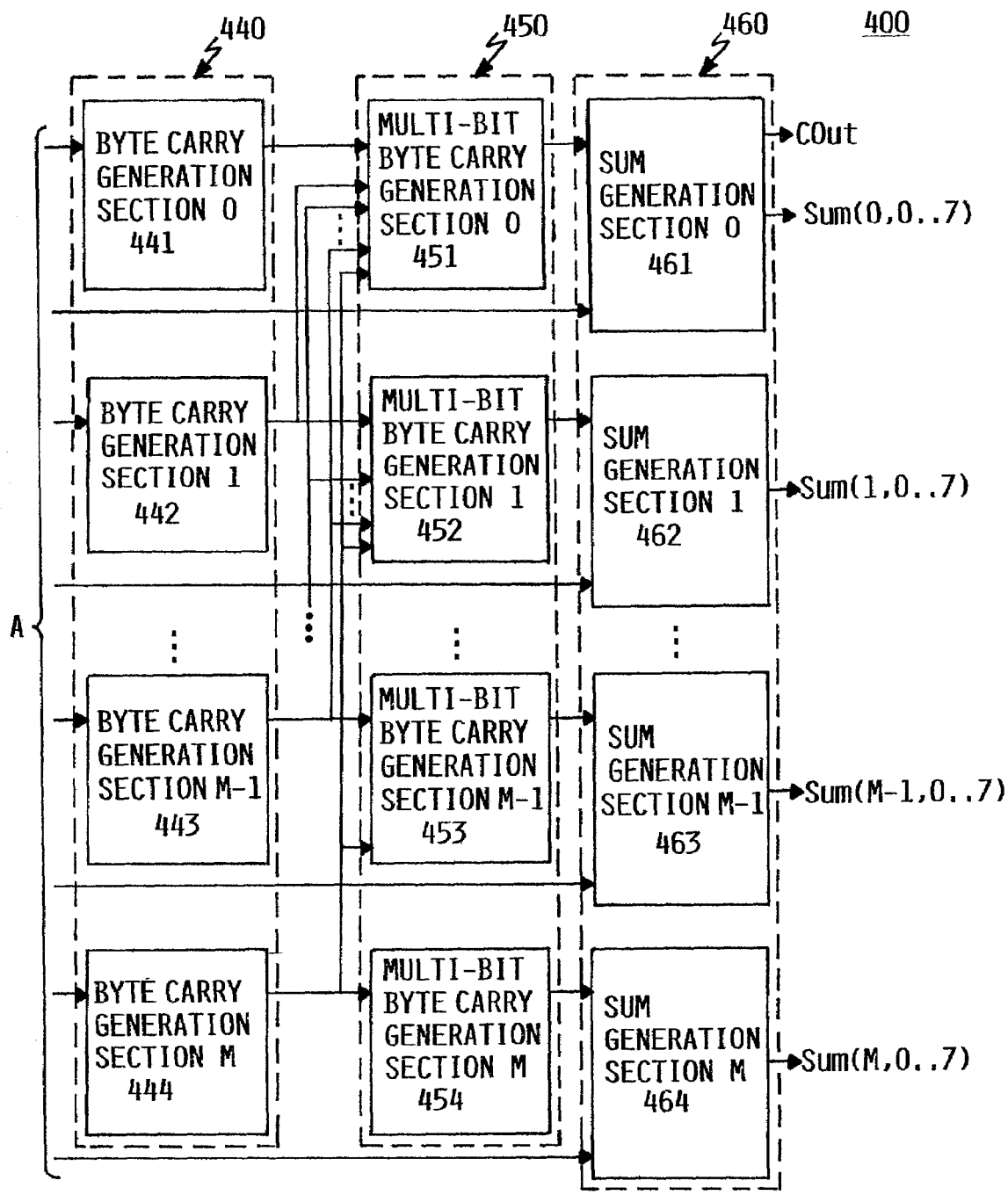
Figure 5G:
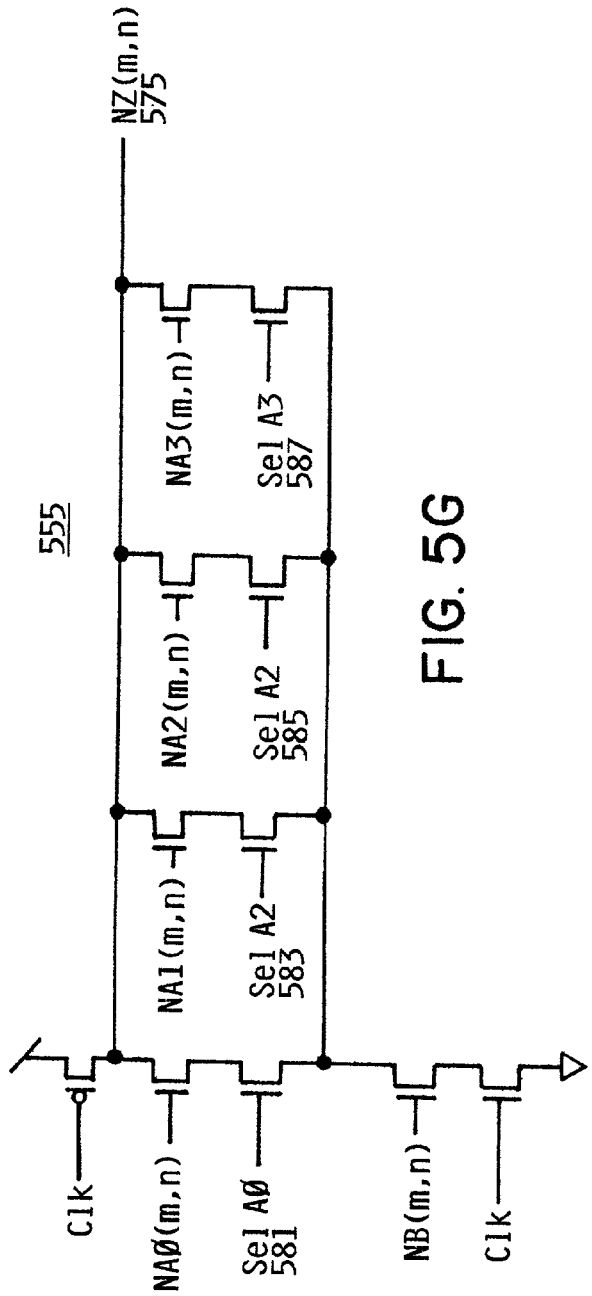
FIG. 5G is an example domino tree forming a Z carry signal and incorporating a multiplexing function.
Figure 5H:
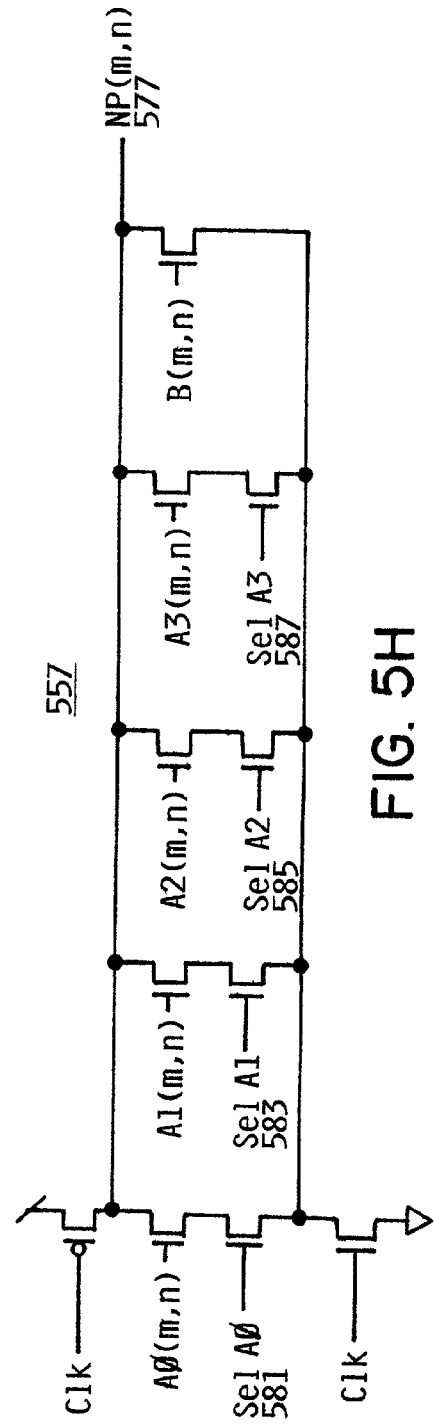
FIG. 5H is an example domino tree forming a P carry signal and incorporating a multiplexing function.

FIG. 4 shows a sectioned adder 400. Term generation 410 is divided into M sections 411, 412, 413, and 414. Multi-bit term generation 420 is divided into M sections 421, 422, 423, and 424. Half-sum generation 430 is divided into M sections 431, 432, 433, and 434. Byte carry generation 440 is divided into M sections 441, 442, 443, and 444. Multi-bit byte carry term generation 450 is divided into M sections 451, 452, 453, and 454. Sum generation 460 is divided into M sections 461, 462, 463, and 464.

Term generation 152 and 410, generates G, Z, P, and K terms. These terms can be thought of as carry "generate", "zero", "propagate", and "kill", respectively. For each bit position, n, within section m, term generation 152 and 410 performs the following logic (or its equivalent):

$G(m,n)=A(m,n)B(m,n)$ $Z(m,n)=NA(m,n)NB(m,n)$ $P(m,n)=A(m,n)+B(m,n)$ $K(m,n)=NA(m,n)+NB(m,n)$

Logically analogous terms can also be generated; for example NG(m,n), rather than G(m,n). For example, as implemented with transistors shown in FIG. 5A through FIG. 5D, an alternate set of equations are:

$NG(m,n)=\text{not}(A(m,n)B(m,n))$ $NZ(m,n)=\text{not}(NA(m,n)NB(m,n))$ $NP(m,n)=\text{not}(A(m,n)+B(m,n))$ $NK(m,n)=\text{not}(NA(m,n)+NB(m,n))$ Note that G(m,n)=NK(m,n) and Z(m,n)=NP(m,n). FIGS. 5A–5D show domino trees 501, 503, 505, and 507 that implement one bit position of an embodiment of term generation 152 and 410. Each of NG(m,n) 521, NK(m,n) 523, NZ(m,n) 525, and NP(m,n) 527 are monotonic falling signals, and form the input portion of domino logic gates.

As described above, domino logic gates have a wide variety of possible implementations, and all of these implementations can be applied to the term generation 152 and 410. For example, a keeper circuit could be added to any or all of the G, Z, P, and K term signals.

Since term generation 152 and 410 is located at the input of the adder 100, latches may be advantageously added, as described above. The addition of latches (or registers) is generally done if the throughput of the pipelined logic that includes the adder 100 can be enhanced by adding latches.

In another embodiment of term generation 152 and 410, one or both inputs, A 141 and B 142, can be a plurality of values. To accomplish this, term generation 152 can include a multiplexer function, and control 147 signals can be included to select between the plurality of values. For example, rather than have just an A 141 input, the adder 100 can have A0, A1, A2, and A3, only one of which is selected for the add function. An embodiment of gates within term generation 152 and 410 incorporating a multiplexer function is shown in FIG. 5A through FIG. 5D. The domino trees 551, 553, 555, and 557 implement a 4-input multiplexer function in addition to generating G, Z, P, and K terms. Selection is accomplished with the assertion of one of the selection signals, SelA0 581, SelA1 583, SelA2 584, and SelA3 586. Each of NG(n) 571, NK(n) 573, NZ(n) 575, and NP(n) 577 are monotonic falling signals, and form the input portion of domino logic gates.

In another embodiment of term generation 152 and 410, both a multiplexer function and a latch is incorporated into each bit position. In each bit position, the multiplexer function can select an input from another bit position or a scan input. The latches can be used to implement a scan path, thereby providing a testing mechanism.

Multi-bit term generation 154 and 420, generates multi-bit Gij(m), Zij(m), Pij(m), and Kij(m) terms, where i and j indicate two bit positions within section m. These terms are generated for a variety of i,j pairs. Within each section of the adder 400, for a plurality of i,j pairs, multi-bit term generation sections 421, 422, 423, and 424 perform:

$Gij(m)=G(m,i)+G(m,i+1)+G(m,i+2)+ \ldots +G(m,j)$ $Kij(m)=K(m,i)K(m,i+1)K(m,i+2) \ldots K(m,j)$ $Zij(m)=Z(m,i)+Z(m,i+1)+Z(m,i+2)+ \ldots +Z(m,j)$ $Pij(m)=P(m,i)P(m,i+1)P(m,i+2) \ldots P(m,j)$ As a particular example to illustrate the nomenclature, P13 and G67 are generated with:

$P13(m)=P(m,1)P(m,2)P(m,3)$ $G67(m)=G(m,6)+G(m,7)$

Alternatively, analogous or equivalent terms can be generated. For example, as implemented with transistors as shown in FIG. 6A and FIG. 6B, an alternate set of equations is:

$P13(m)=\text{not}(NP(m,1)+NP(m,2)+NP(m,3))$ $G67(m)=\text{not}(NG(m,6)NG(m,7))$ In some cases, i=j, indicating only one bit is included. For example, G77(m)=not(NG(m,7)).

Figure 6A:
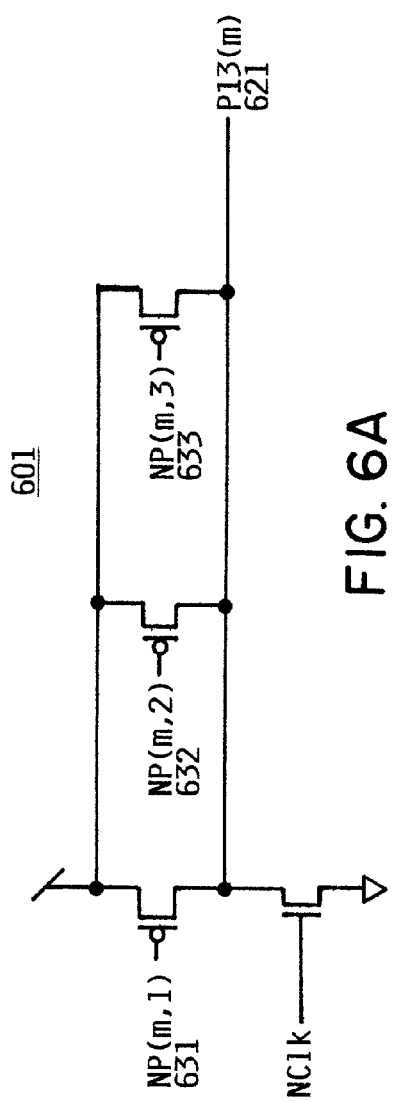
FIG. 6A is an example domino tree forming a multi-bit P carry signal.
Figure 6B:
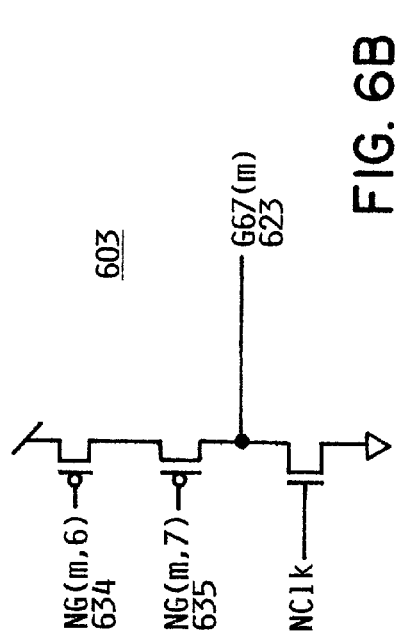
FIG. 6B is an example domino tree forming a multi-bit G carry signal.

FIG. 6A and FIG. 6B show precharged low domino trees 601 and 603, forming P13 621 and G67 627. These two domino trees 601 and 603 take monotonic falling signals 631, 632, 633, 634, and 635 and output monotonic rising signals 621 and 627.

Other implementation choices can be applied to the multi-bit term generation 154 and 420. For example, a keeper circuit could be added the output signals 621 and 627. As another example embodiment, static logic can be used for multi-bit term generation 154 and 420, as exemplified in FIG. 6C and FIG. 6D.

Selection of specific i,j pairs for each term depends on the implementation of byte carry generation 158 and 440 because that is where the outputs from multi-bit term generation 154 and 420 are used.

When implemented with domino logic, the first level of logic 110 can be composed of a single layer of logic, comprising term generation 152 and 410 and multi-bit term generation 154 and 420.

Byte carry generation 158 and 440 takes multi-bit Gij(m), Zij(m), Pij(m), and Kij(m) terms and generates section-based carry signals BGk(m), BZk(m), BPk(m), and BKk(m), where k indicates the number of least significant bit positions within section m that are included in the signal. The "B" in the signal name stands for "byte", but as described, sections can be any number of bits. Hence, assuming byte-based sections, BK5(m) is the K carry signal for byte m, and includes bits 3 through 7.

Using bit-base carry signals, the equation for the byte-based P carry signal for all 8 bits in a byte is:

$$BP8(m) = G(m, 0) +$$
$$P(m, 0)G(m, 1) +$$
$$P(m, 0)P(m, 1)G(m, 2) +$$
$$P(m, 0)P(m, 1)P(m, 2)G(m, 3) +$$
$$P(m, 0)P(m, 1)P(m, 2)P(m, 3)G(m, 4) +$$
$$P(m, 0)P(m, 1)P(m, 2)P(m, 3)P(m, 4)G(m, 5) +$$
$$P(m, 0)P(m, 1)P(m, 2)P(m, 3)P(m, 4)P(m, 5)G(m, 6) +$$
$$P(m, 0)P(m, 1)P(m, 2)P(m, 3)P(m, 4)P(m, 5)P(m, 6)G(m, 7)$$

Using bit-base carry signals and making some logic optimizations (using, for example, the fact that if G(m,0) is true, then P(m,0) must also be true), the equations for the byte-based P carry signals are:

$$BP8(m) = P(m, 0)(G(m, 0) + G(m, 1)) +$$
$$P(m, 0)P(m, 1)P(m, 2)(G(m, 2) + G(m, 3)) +$$
$$P(m, 0)P(m, 1)P(m, 2)P(m, 3)P(m, 4)(G(m, 4) + G(m, 5)) +$$
$$P(m, 0)P(m, 1)P(m, 2)P(m, 3)P(m, 4)P(m, 5)G(m, 6) +$$
$$P(m, 0)P(m, 1)P(m, 2)P(m, 3)P(m, 4)P(m, 5)P(m, 6)P(m, 7)$$
$$BP7(m) = G(m, 1) +$$
$$P(m, 1)P(m, 2)(G(m, 2) + G(m, 3)) +$$
$$P(m, 1)P(m, 2)P(m, 3)P(m, 4)(G(m, 4) + G(m, 5)) +$$
$$P(m, 1)P(m, 2)P(m, 3)P(m, 4)P(m, 5)G(m, 6) +$$
$$P(m, 1)P(m, 2)P(m, 3)P(m, 4)P(m, 5)P(m, 6)P(m, 7)$$
$$BP6(m) = P(m, 2)(G(m, 2) + G(m, 3)) +$$
$$P(m, 2)P(m, 3)P(m, 4)(G(m, 4) + G(m, 5)) +$$
$$P(m, 2)P(m, 3)P(m, 4)P(m, 5)G(m, 6) +$$
$$P(m, 2)P(m, 3)P(m, 4)P(m, 5)P(m, 6)P(m, 7)$$
$$BP5(m) = G(m, 3) +$$
$$P(m, 3)P(m, 4)(m, G(m, 4) + G(m, 5)) +$$
$$P(m, 3)P(m, 4)P(m, 5)G(m, 6) +$$
$$P(m, 3)P(m, 4)P(m, 5)P(m, 6)P(m, 7)$$
$$BP4(m) = P(m, 4)(m, G(m, 4) + G(m, 5)) +$$
$$P(m, 4)P(m, 5)G(m, 6) +$$
$$P(m, 4)P(m, 5)P(m, 6)P(m, 7)$$
$$BP3(m) = G(m, 5) +$$
$$P(m, 5)G(m, 6) +$$
$$P(m, 5)P(m, 6)P(m, 7)$$
$$BP2(m) = G(m, 6) + P(m, 6)P(m, 7)$$
$$BP1(m) = P(m, 7)$$

For example, in the above equations, BP8(m), a "propagate carry" signal, will be true if all the P bits are true, and this is indicated in the last product term of that equation. The bit-based values in the above equations are replaced by their multi-bit values, as these multi-bit values are generated by multi-bit term generation 154 and 420. An example embodiment for the P carry signals in a section 441, 442, 443, and 444 is shown in the equations:

$$BP8(m) = P00(m)G01(m)P02(m)G23(m) +$$
$$P01(m)P23(m)P44(m)G45(m) +$$
$$P01(m)P23(m)P45(m)G66(m) +$$
$$P01(m)P23(m)P45(m)P67(m)$$
$$BP7(m) = G11(m)P12(m)G23(m) +$$
$$P12(m)P34(m)G45(m) +$$
$$P13(m)P45(m)G66(m) +$$
$$P11(m)P23(m)P45(m)P67(m)$$
$$BP6(m) = P22(m)G23(m) +$$
$$P23(m)P44(m)G45(m) +$$
$$P23(m)P45(m)G66(m) +$$
$$P23(m)P45(m)P67(m)$$
$$BP5(m) = G3(m) +$$
$$P34(m)G45(m) +$$
$$P35(m)G66(m) +$$
$$P35(m)P67(m)$$

$$BP4(m) = P44(m)G45(m) + P45(m)G66(m) + P45(m)P67(m)$$

$$BP3(m) = G55(m) + P55(m)G66(m) + P57(m)$$

$$BP2(m) = G66(m) + P77(m)$$

$$BP1(m) = P77(m)$$

Figure 7A:
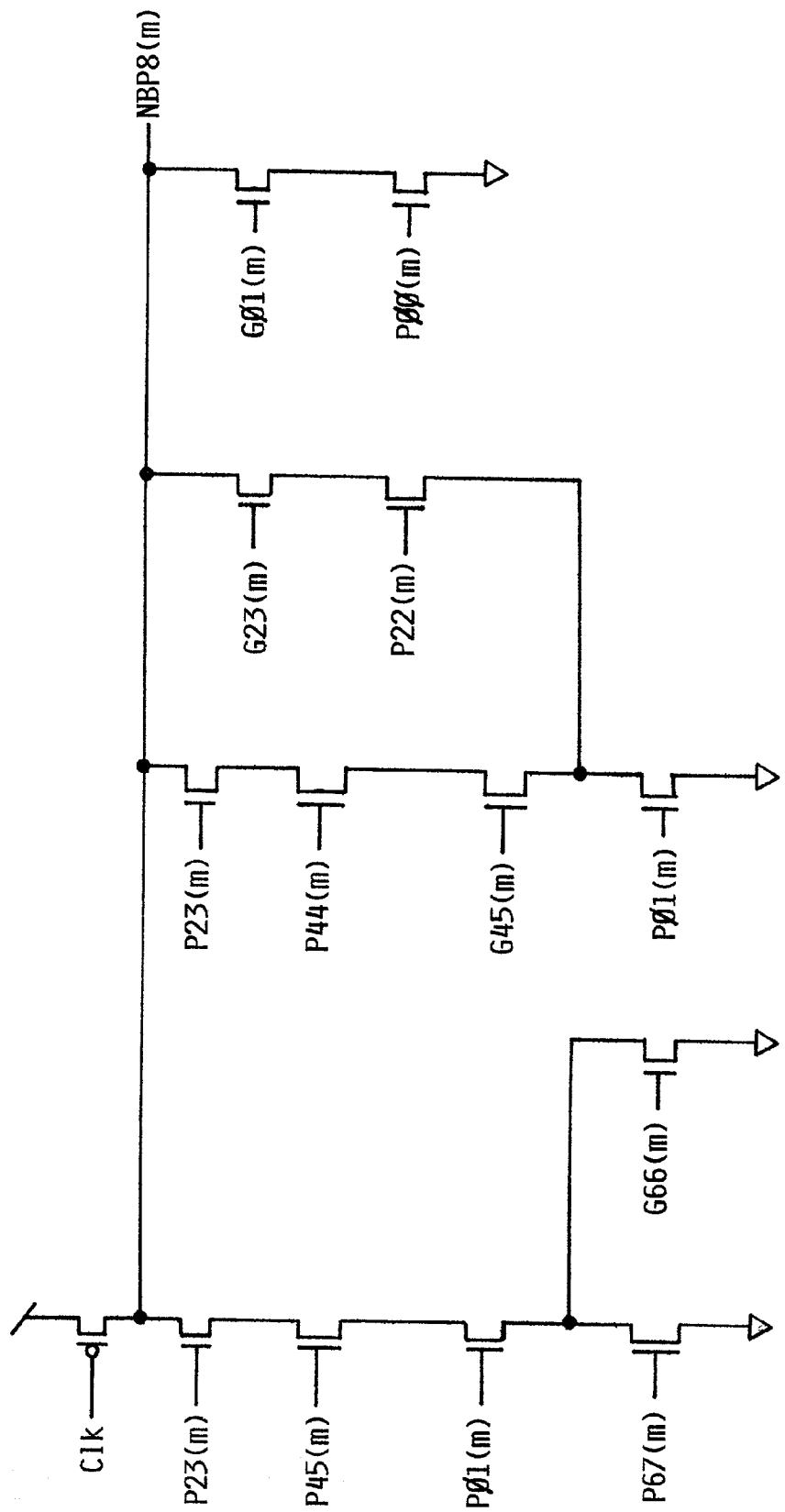
FIG. 7A is an example domino tree forming a P byte carry signal.

Alternatively, an inverted set of signals can be generated. An example domino tree is shown in FIG. 7A, and the following equation for NBP8(m) is implemented by that circuit.

$$NBP8(m) = \text{not}(P00(m)G01(m) + P01(m)P22(m)G23(m) +$$
$$P01(m)P23(m)P44(m)G45(m) +$$
$$P01(m)P23(m)P45(m)G66(m) +$$
$$P01(m)P23(m)P45(m)P67(m))$$

Using bit-base G carry signals, the equations for the section-based G carry signals are:

$$BG8(m) = P(m, 0)(G(m, 0) + G(m, 1)) +$$
$$P(m, 0)P(m, 1)P(m, 2)(G(m, 2) + G(m, 3)) +$$
$$P(m, 0)P(m, 1)P(m, 2)P(m, 3)P(m, 4)(G(m, 4) + G(m, 5)) +$$
$$P(m, 0)P(m, 1)P(m, 2)P(m, 3)P(m, 4)P(m, 5)(G(m, 6) + G(m, 7)) +$$
$$P(m, 0)P(m, 1)P(m, 2)P(m, 3)P(m, 4)P(m, 5)P(m, 6)P(m, 7)CIn$$

$$BG7(m) = G(m, 1) +$$
$$P(m, 1)P(m, 2)(G(m, 2) + G(m, 3)) +$$
$$P(m, 1)P(m, 2)P(m, 3)P(m, 4)(G(m, 4) + G(m, 5)) +$$
$$P(m, 1)P(m, 2)P(m, 3)P(m, 4)P(m, 5)(G(m, 6) + G(m, 7)) +$$
$$P(m, 1)P(m, 2)P(m, 3)P(m, 4)P(m, 5)P(m, 6)P(m, 7)CIn$$

$$BG6(m) = P(m, 2)(G(m, 2) + G(m, 3)) +$$
$$P(m, 2)P(m, 3)P(m, 4)(G(m, 4) + G(m, 5)) +$$
$$P(m, 2)P(m, 3)P(m, 4)P(m, 5)(G(m, 6) + G(m, 7)) +$$
$$P(m, 2)P(m, 3)P(m, 4)P(m, 5)P(m, 6)P(m, 7)CIn$$

$$BG5(m) = G(m, 3) +$$
$$P(m, 3)P(m, 4)(m, G(m, 4) + G(m, 5)) +$$
$$P(m, 3)P(m, 4)P(m, 5)(G(m, 6) + G(m, 7)) +$$
$$P(m, 3)P(m, 4)P(m, 5)P(m, 6)P(m, 7)CIn$$

$$BG4(m) = P(m, 4)(m, G(m, 4) + G(m, 5)) +$$
$$P(m, 4)P(m, 5)(G(m, 6) + G(m, 7)) +$$
$$P(m, 4)P(m, 5)P(m, 6)P(m, 7)CIn$$

$$BG3(m) = G(m, 5) +$$
$$P(m, 5)(G(m, 6) + G(m, 7)) +$$
$$P(m, 5)P(m, 6)P(m, 7)CIn$$

$$BG2(m) = P(m,6)(G(m,6)+G(m,7))+P(m,6)P(m,7)CIn$$

$$BG1(m) = G(m,7)+P(m,7)CIn$$

Just as for the P carry signal equations above, the bit-based G carry values in the above equations are replaced by their multi-bit values. An example embodiment is shown in the equations:

$$BG8(m) = P00(m)G01(m) + P02(m)G23(m) +$$
$$P01(m)P23(m)P44(m)G45(m) +$$
$$P01(m)P23(m)P46(m)G67(m)$$

$$BG7(m) = G11(m) + P12(m)G23(m) +$$
$$P12(m)P34(m)G45(m) +$$
$$P13(m)P45(m)G67(m)$$

$$BG6(m) = P22(m)G23(m) +$$
$$P23(m)P44(m)G45(m) +$$
$$P23(m)P45(m)G67(m)$$

$$BG5(m) = G3(m)+P34(m)G45(m)+P35(m)G67(m)$$

$$BG4(m) = P44(m)G45(m)+P45(m)G67(m)$$

$$BG3(m) = G55(m)+P55(m)G67(m)$$

$$BG2(m) = P66(m)G67(m)$$

$$BG1(m) = G77(m)$$

For the least significant section (in a byte-based embodiment, the least significant byte is byte 7), the carry input, Cin, must be taken into account, resulting in another product term in the equations for the G carry signals:

$$BG8(7) = P(7,0)(G(7,0) + G(7,1)) +$$
$$P(7,0)P(7,1)P(7,2)(G(7,2) + G(7,3)) +$$
$$P(7,0)P(7,1)P(7,2)P(7,3)P(7,4)(G(7,4) + G(7,5)) +$$
$$P(7,0)P(7,1)P(7,2)P(7,3)P(7,4)P(7,5)(G(7,6) + G(7,7)) +$$
$$P(7,0)P(7,1)P(7,2)P(7,3)P(7,4)P(7,5)P(7,6)P(7,7)CIn$$

$$BG7(7) = G(7,1) +$$
$$P(7,1)P(7,2)(G(7,2) + G(7,3)) +$$
$$P(7,1)P(7,2)P(7,3)P(7,4)(G(7,4) + G(7,5)) +$$
$$P(7,1)P(7,2)P(7,3)P(7,4)P(7,5)(G(7,6) + G(7,7)) +$$
$$P(7,1)P(7,2)P(7,3)P(7,4)P(7,5)P(7,6)P(7,7)CIn$$

$$BG6(7) = P(7,2)(G(7,2) + G(7,3)) +$$
$$P(7,2)P(7,3)P(7,4)(G(7,4) + G(7,5)) +$$
$$P(7,2)P(7,3)P(7,4)P(7,5)(G(7,6) + G(7,7)) +$$
$$P(7,2)P(7,3)P(7,4)P(7,5)P(7,6)P(7,7)CIn$$

$$BG5(7) = G(7,3) +$$
$$P(7,3)P(7,4)(7, G(7,4) + G(7,5)) +$$
$$P(7,3)P(7,4)P(7,5)(G(7,6) + G(7,7)) +$$
$$P(7,3)P(7,4)P(7,5)P(7,6)P(7,7)CIn$$

$$BG4(7) = P(7,4)(7, G(7,4) + G(7,5)) +$$
$$P(7,4)P(7,5)(G(7,6) + G(7,7)) +$$
$$P(7,4)P(7,5)P(7,6)P(7,7)CIn$$

$$BG3(7) = G(7,5) +$$
$$P(7,5)(G(7,6) + G(7,7)) +$$
$$P(7,5)P(7,6)P(7,7)CIn$$

$$BG2(7)=P(7,6)G(7,6)G(7,7)+P(7,6)P(7,7)CIn$$

$$BG1(7)=G(7,7)+P(7,7)CIn$$

Once again, the bit-based values in the above equations are replaced by their multi-bit values. An example embodiment is shown in the equations:

$$BG8(7) = P00(7)G01(7) + P02(7)G23(7) +$$
$$P01(7)P23(7)P44(7)G45(7) +$$
$$P01(7)P23(7)P46(7)G67(7) +$$
$$P01(7)P23(7)P45(7)P67(7)Cln$$

$$BG7(7) = G11(7) + P12(7)G23(7) +$$
$$P12(7)P34(7)G45(7) +$$
$$P13(7)P45(7)G67(7) +$$
$$P11(7)P23(7)P45(7)P67(7)Cln$$

$$BG6(7) = P22(7)G23(7) +$$
$$P23(7)P44(7)G45(7) +$$
$$P23(7)P45(7)G67(7) +$$
$$P23(7)P45(7)P67(7)Cln$$

$$BG5(7) = G3(7) +$$
$$P34(7)G45(7) +$$
$$P35(7)G67(7) +$$
$$P35(7)P67(7)Cln$$

$$BG4(7)=P44(7)G45(7)+P45(7)G67(7)+P45(7)P67(7)CIn$$

$$BG3(7)=G55(7)+P55(7)G67(7)+P57(7)CIn$$

$$BG2(7)=P66(7)G67(7)+P67(7)CIn$$

$$BG1(7)=G77(7)+P77(7)CIn$$

Figure 7B:
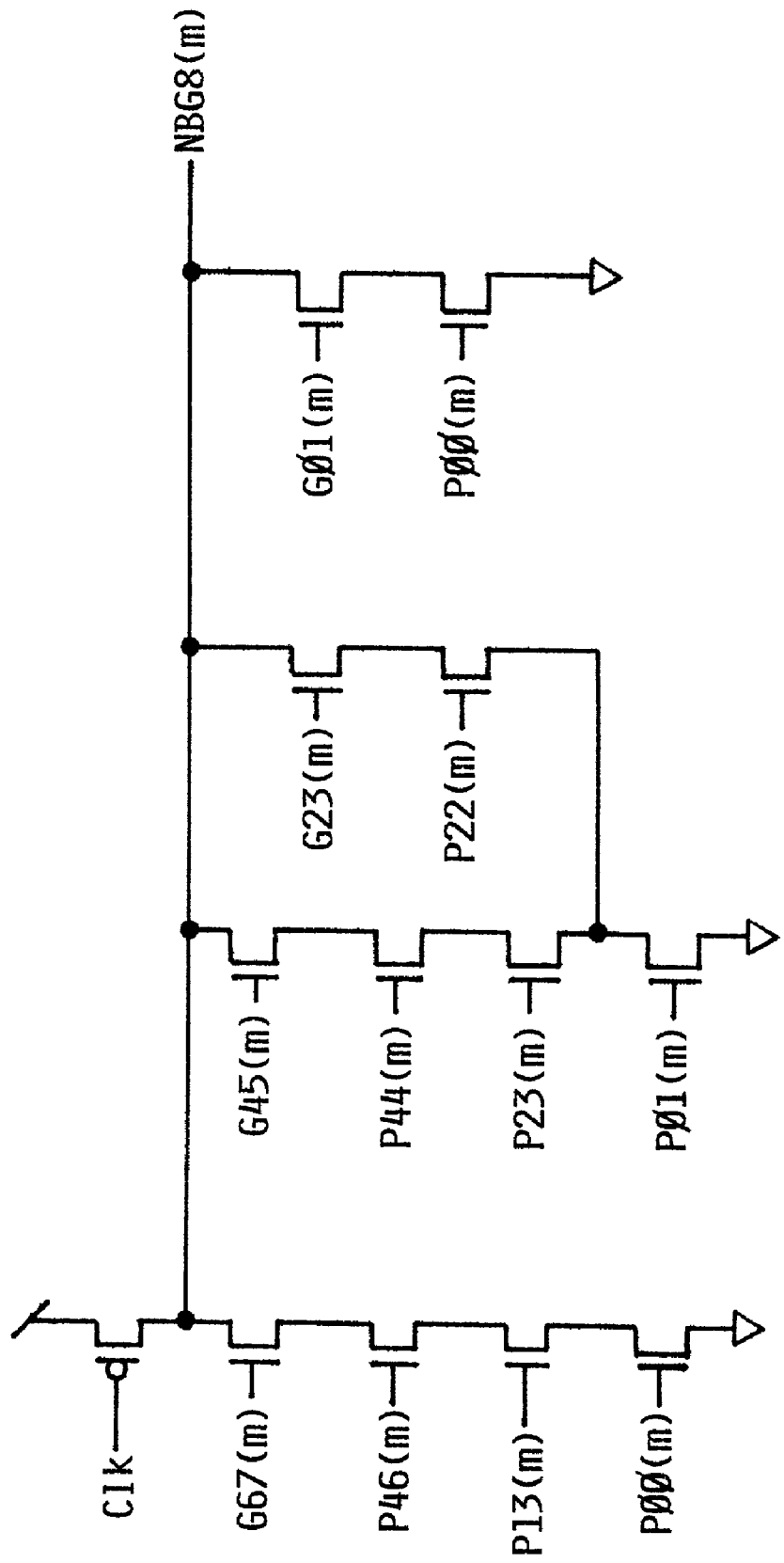
FIG. 7B is an example domino tree forming a G byte carry signal.

Alternatively, an inverted set of signals can be generated. An example domino tree is shown in FIG. 7B, and the following equation for NBG8(m) is implemented by that circuit.

$$NBG8(m) = \text{not}(P00(m)G01(m) + P01(m)P22(m)G23(m) +$$
$$P01(m)P23(m)P44(m)G45(m) +$$
$$P00(m)P13(m)P45(m)G67(m))$$

The equations for K and Z terms are similar to the above equations. Equations for K and Z terms can be created by substituting K for P and substituting Z for G.

The multi-bit byte carry generation 160 and 450, generates multi-bit BGij, BZij, BPij, and BKij terms, where i and j indicate two sections within the sectioned adder 400. Hence, each of these terms receives input from one or more sections 441, 442, 443, and 444 within byte carry generation 440. These terms are generated for a variety of i,j pairs, as needed in sum generation 460. Byte carry signals for the entire byte are used, which is why all the right-hand side values have an "8" (e.g., BG8(i)). For a plurality of i,j pairs, multi-bit term generation 154 performs:

$$BGij=BG8(i)+BG8(i+1)+BG8(i+2)+ \ldots +BG8(j)$$

$$BKij=BK8(i)BK8(i+1)BK8(i+2) \ldots BK8(j)$$

$$BZij=BZ8(i)+BZ8(i+1)+BZ8(i+2)+ \ldots +BZ8(j)$$

$$BPij=BP8(i)\ BP8(i+1)BP8(i+2) \ldots BP8(j)$$

Since these equations are similar to the equations for multi-bit term generation 154 and 420, similar circuits can be used. The transistor circuits in FIG. 6A and FIG. 6B can be used.

In parallel with the byte carry generation 158 and 440 is logic to generate the half-sum: A(n) XOR B(n) and A(n) XNOR B(n). In the sectioned adder 400, this is A(m,n) XOR B(m,n) and A(m,n) XNOR B(m,n). Rather than do this operation directly, which would require extra latches for A and B, the P,G,Z, and K terms for each bit can be used:

$$HS(m,n)=P(m,n)+K(m,n)$$

$$NHS(m,n)=G(m,n)\ Z(m,n)$$

These equations are implemented with gates, either static or dynamic. Transistor circuits similar to those in FIG. 6A and FIG. 6B can be used.

The final level of logic, sum generation 130 and 460, performs the combination of the byte carries, the multi-bit byte carries, and the half-sum to generate the final sum and carry out. The equation for the sum of any given bit is:

$$\text{Sum}(m,n)=A(m,n)\ XOR\ B(m,n)\ XOR\ C(m,n)$$

The half-sum, HS and NHS, have been computed in half-sum generation 156 and 430, so all that remains is to combine it with C(m,n) for each bit n in each section m. For any bit n in the most significant byte (byte 0), this can be achieved with the following:

$$\text{Sum}(0,n)=HS(0,n)\ XOR\ C(0,n)=HS(0,n)NC(0,n)+NHS(0,n)C(0,n)$$

The signals C(0,n) and NC(0,n) are formed by combining the appropriate byte carry signals. For example, for bit 5 in section 0, the Sum(0,5) is derived as follows:

$$= HS(0,5)(BZ3(0) +$$
$$BK3(0)BZ8(1) +$$
$$BK3(0)BZ8(1)BZ8(2) +$$
$$BK3(0)BZ8(1)BZ8(2)BZ8(3) +$$
$$BK3(0)BZ8(1)BZ8(2)BZ8(3)BZ8(4) +$$
$$BK3(0)BZ8(1)BZ8(2)BZ8(3)BZ8(4)BZ8(5) +$$
$$BK3(0)BZ8(1)BZ8(2)BZ8(3)BZ8(4)BZ8(5)BZ8(6) +$$
$$BK3(0)BZ8(1)BZ8(2)BZ8(3)BZ8(4)BZ8(5)BZ8(6)BZ8(7) +$$
$$NHS(0,5)(BG3(0) +$$
$$BP3(0)BG8(1) +$$
$$BP3(0)BP8(1)BG8(2) +$$
$$BP3(0)BP8(1)BP8(2)BG8(3) +$$
$$BP3(0)BP8(1)BP8(2)BP8(3)BG8(4) +$$
$$BP3(0)BP8(1)BP8(2)BP8(3)BP8(4)BG8(5) +$$
$$BP3(0)BP8(1)BP8(2)BP8(3)BP8(4)BP8(5)BG8(6) +$$
$$BP3(0)BP8(1)BP8(2)BP8(3)BP8(4)BP8(5)BP8(6)BG8(7))$$

Sum(0,5) can be implemented with multi-bit byte carry values as follows:

$$Sum(0,5) = (BG3(0)NHS(5) +$$
$$BP3(0)BP8(1)(BG12 + BP23)NHS(5) +$$
$$BZ3(0)HS(5) +$$
$$BK3(0)BK8(1)(BZ12 + BK23)HS(5)) $$
$$((BG3(0) + BG8(1) + BG24)NHS(5) +$$
$$BP45(BG56 + BP8(6)BG8(7))NHS(5) +$$
$$(BZ3(0) + BZ8(1) + BZ24)HS(5) +$$
$$BK45(BZ56 + BK8(6)BZ8(7))HS(5))$$

Figure 8:
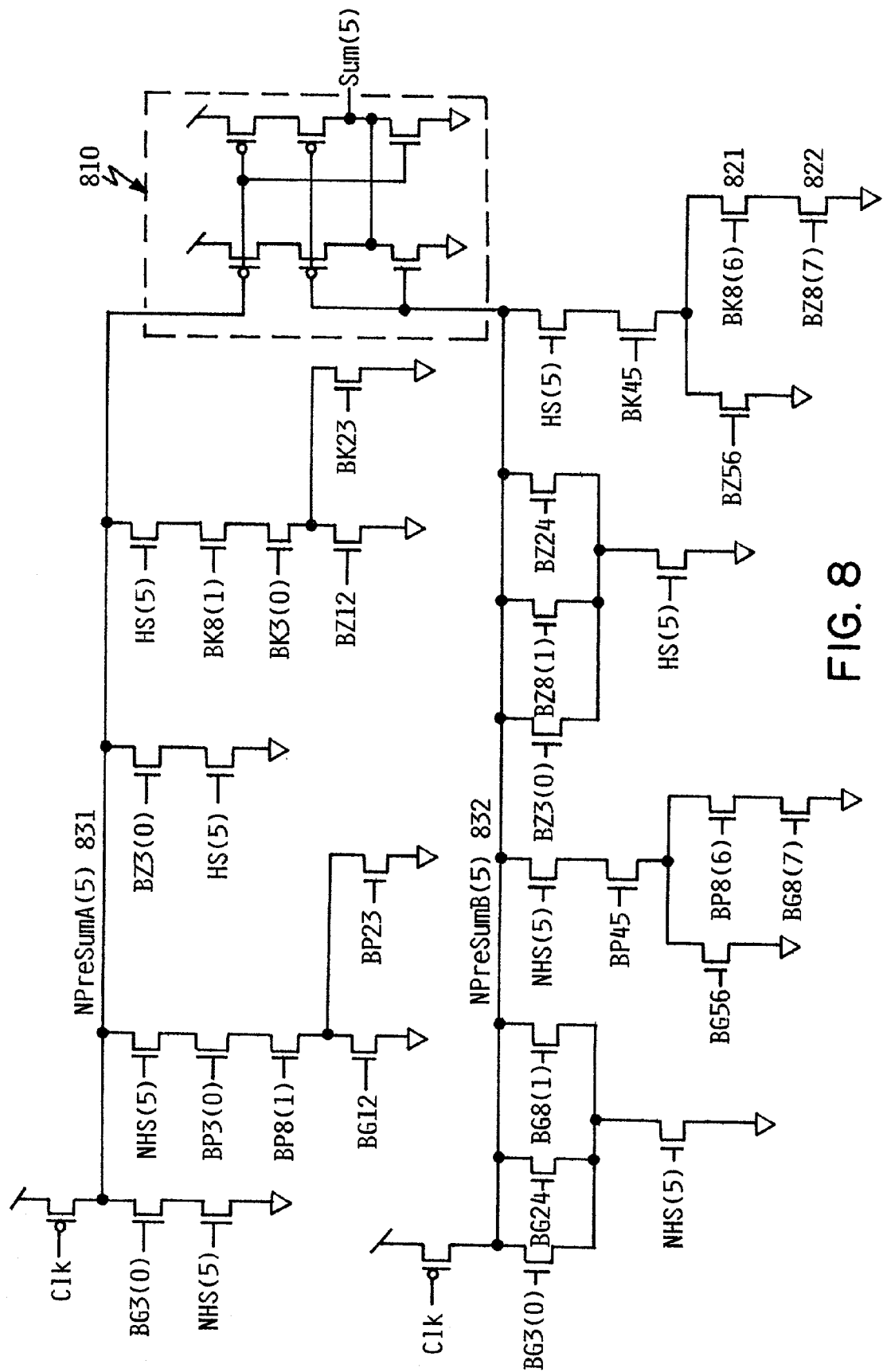
FIG. 8 is an example domino gate forming sum bit.

A domino logic circuit for the above equation is shown in FIG. 8. The sum bits for other bit positions and for lower significant bytes can be generated similarly.

FIG. 8 includes a NOR circuit 810. That is, the signals, NPreSumA(5) 831 and NPreSumB(5) 832, are ORed and the result is inverted. Alternatively, a typical 4-transistor static NOR circuit can be used.

As an alternate embodiment, rather than generate identical signals in more than one multi-bit byte carry generation section 451, 452, 453, and 454, a signal can be generated in one section 451, 452, 453, and 454 and passed to multiple sum generation sections 461, 462, 463, and 464.

As another alternate embodiment, multi-bit byte carry generation sections 451, 452, 453, and 454 can logically combine byte carry signals of different types. For example, BK8(6) could be ANDed with BZ8(7), which would, in turn, reduce the number of transistors by replacing two transistors 821 and 822 with one transistor.

The embodiments in the above-described figures have domino trees with no more than four transistors in series. That is, no more than four pulldown transistors or pullup transistors are in series. This maximum of four transistors in series is desirable because more transistors in series would cause the circuit to have greater delay. The selection of specific multi-bit terms and multi-bit byte carry terms are optimized to reduce the maximum number of series transistors, thereby increasing circuit speed.

The embodiments described provide for an adder with only three gate delays in its critical path. It would be easy to add additional gate delays. For example, additional buffering could be added. Or, large domino gates could be split into two smaller domino gates in series.

While the present invention has been described in particular embodiments, it should be appreciated that the present invention should not be construed as limited by such embodiments, but rather construed according to the below claims.

What is claimed is:

1. An apparatus, comprising: a plurality of gates, the critical path through the plurality of gates being three gates configured to generate a sum of at least two binary numbers each having at least 64 bits.

2. The apparatus of claim 1 wherein:
at least one of the gates is a domino logic gate.

3. The apparatus of claim 1 wherein:
all the gates in the critical path are domino logic gates.

4. The apparatus of claim 3 wherein:
at least one of the domino logic gates in the critical path comprises a latch.

5. The apparatus of claim 4 wherein:
the latch is part of a scan path for testing the adder.

6. The apparatus of claim 3 wherein:
at least one of the domino logic gates comprises a multiplexer function.

7. The apparatus of claim 3 wherein:
at least one of the domino logic gates comprises a multiplexer function and a latch.

8. An apparatus, comprising:
a critical path of three gate delays, the critical path comprising:
a first gate within a first level of logic, the first level of logic receiving at least two binary number, each with at least 64 bits, and generating multi-bit carry signals;
a second gate within a second level of logic, the second level of logic receiving the multi-bit carry signals and generating multi-bit section-based carry signals; and
a third gate within a third level of logic, the third level of logic receiving the multi-bit section-based carry signals and generating a sum of the received binary numbers.

9. The apparatus of claim 8 wherein:
the three gates are each a domino logic gate.

10. The apparatus of claim 9 wherein:
the domino logic gate in the first level of logic comprises a latch.

11. The apparatus of claim 10 wherein:
the latch is part of a scan path.

12. The apparatus of claim 9 wherein:
the domino logic gate in the first level of logic comprises a multiplexer function.

13. The apparatus of claim 9 wherein:
the first level of logic comprises:
a plurality of domino trees forming P, G, Z, and K carry signals; and
circuits forming multi-bit P, G, Z, and K carry signals;
the second level of logic comprises:
a plurality of domino trees forming section-based P, G, Z, and K carry signals; and
circuits forming multi-bit section-based P, G, Z, and K carry signals; and
the third level of logic comprises:
a plurality of domino logic gates forming sum bits.

14. An apparatus for adding numbers with at least 64 bits, the apparatus comprising:
a first level of logic for receiving at least two binary numbers and generating multi-bit carry signals, the first level of logic comprising domino logic gates;
a second level of logic receiving the multi-bit carry signals and generating multi-bit section-based carry signals, the second level of logic comprising domino logic gates; and
a third level of logic receiving the multi-bit section-based carry signals and generating a sum of the received binary numbers, the third level of logic comprising domino logic gates; wherein a longest circuit path through the apparatus is three domino logic gates.

15. An apparatus, comprising:
an adder for adding numbers with at least 56 bits, the adder comprising:
a critical path of three gate delays, the critical path comprising:
a first gate within a first level of logic, the first level of logic receiving at least two binary numbers and generating multi-bit carry signals;
a second gate within a second level of logic, the second level of logic receiving the multi-bit carry signals and generating multi-bit section-based carry signals; and
a third gate within a third level of logic, the third level of logic receiving the multi-bit section-based carry signals and generating a sum of the received binary numbers.

16. The apparatus of claim 15 wherein: the three gates are each a domino logic gate.

* * * * *